March 24, 1970 W. B. ALMASSY Re. 26,835

INDEPENDENT LOAD FLASHER

Original Filed Aug. 27, 1963

INVENTOR.
WILLIAM B. ALMASSY

BY

Eyre Mann & Lucas
ATTORNEYS

United States Patent Office

Re. 26,835
Reissued Mar. 24, 1970

26,835
INDEPENDENT LOAD FLASHER

William B. Almassy, Littleton, Colo., assignor, by mesne assignments, to Wagner Electric Corporation, South Bend, Ind., a corporation of Delaware Original No. 3,267,330, dated Aug. 16, 1966, Ser. No. 304,822, Aug. 27, 1963. Application for reissue Apr. 17, 1968, Ser. No. 724,321

Int. Cl. H01j *7/44, 13/46*

U.S. Cl. 315—50 4 Claims

Matter enclosed in heavy brackets [ ] appears in the original patent but forms no part of this reissue specification; matter printed in italics indicates the additions made by reissue.

*ABSTRACT OF THE DISCLOSURE*

*A flasher is constructed of (1) a snap switch having movable and stationary contacts which are controlled to engage and disengage by cooling and heating of a heat-expansible pull means, (2) a reed relay having a coil and relay contacts which are controlled to engage and disengage by current flow at a predetermined level and absence of such flow through the coil, and (3) a heater for the pull means. The relay coil and snap switch are in series with each other and with a voltage source at one side and a lamp load at the other side thereof. The heater and relay contacts are in series with each other and are parallel to the snap switch and lamp load, whereby the lamp load may be flashed at substantially constant rate regardless of increase in current flow through the relay coil above the predetermined level.*

The present invention relates to flashers of the type adapted for use for directional signals in trucks or the like and comprises a novel three terminal flasher in which the flashing rate and ratio is independent of the lamp load and in which positive pilot indication is provided.

A feature of the invention is the use in the flasher of a reed relay in combination with a snap switch operating in response to expansion and contraction of a pull means with change in temperature. The flasher of the invention may be incorporated in a variety of circuits and preferably such circuits provide that the lamp load and the pull means, or heater for the pull means, will be connected in parallel to insure independence of the flashing rate from the load.

In its simplest embodiment the invention comprises a snap switch of the type disclosed and claimed in Schmidinger Patent No. 2,761,931 with which is associated a reed relay the normally open contacts of which are connected in series with a heater for the pull wire of the snap switch and the coil of which is connected in series with the normally closed contacts of the snap switch. The snap switch and reed relay are mounted in close proximity on an insulating base provided with three terminals for connection to a source of potential, to the load and to a pilot signal. When a large number of lamps comprise the lamp load the new flasher preferably includes a relatively powerful relay for controlling the contacts in the circuit of the load.

For a better understanding of the invention and of specific embodiments thereof reference may be had to the accompanying drawings of which:

Figure 1:
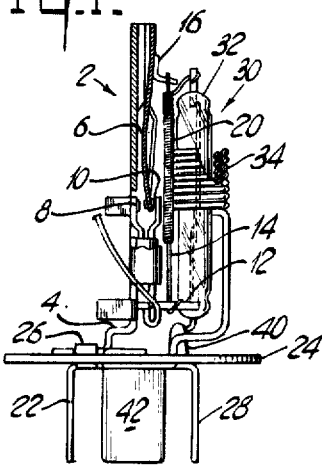
FIG. 1 is a side view partially broken away of a flasher embodying the invention.

In FIG. 1 a snap switch of the general type of that of the above mentioned Schmidinger patent is indicated generally by the reference numeral 2. It comprises a frame 4, a snap plate 6 the upper end of which is welded to the frame 4, and the lower end of which carries contacts for engagement with fixed contacts 8 and 10. A finger 12, extending from the frame 4, has secured to it one end of a wire 14 the other end of which is fastened under tension to one arm of an L-shaped anchor member 16. The other arm of the anchor member 16 is welded to a vane 18 defined by two closed ended longitudinal slots cut in the plate 6. The tension in the wire 14 is such as to maintain the lower end of the plate 6 in engagement with the fixed contact 10 when the wire 14 is cold. For a better understanding of the construction of the snap action device 2 reference may be had to the above mentioned patent.

In the particular construction of FIG. 1 expansion of the pull wire 14 is effected by means of a heater winding 20 comprising very thin wire having an insulating ceramic coating thereon. A prong terminal 22 is secured to the under side of a base 24 of insulating material by means of fingers 26 which pierce the base. Above the base the fingers are bent over a horizontally extending portion of the frame 4 to clamp the frame to the base. Also mounted on the base 24 by means of fingers of a prong terminal 28 is a reed relay, indicated generally at 30, and comprising a glass tube 32 and coil 34 surrounding the tube. Within the tube 32 are reed contacts 36 and 38 which are normally out of engagement but which are brought into contact when the coil 34 is energized. Contact 38 is connected through the lower end of the tube 32 to a support element 40 for the relay. Contact 36 is connected through the upper end of the tube to one end of the heater 20 for the pull wire. One end of the relay coil is connected to a third prong terminal 42 and the other end of the relay coil is connected to the normally closed contact 10 of the snap switch.

Figure 2:
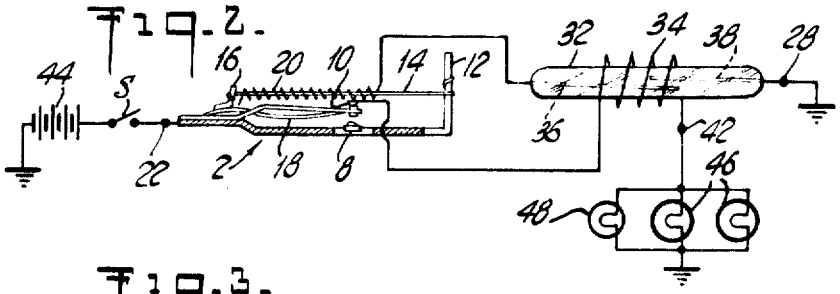
FIG. 2 is a diagram of suitable circuit connections for the device of FIG. 1.

The operation of the structure of FIG. 1 and the circuit thereof will be better understood by reference to FIG. 2 in which the structure of the snap plate is only diagrammatically shown and in which the supporting means for the reed relay and for the snap plate are not shown. As shown in FIG. 2, terminal 22 through a manually operated switch "S" is connected to a source of power, indicated as a battery 44, which may be a car or truck carried battery. The negative terminal of the battery is grounded as is terminal 28. A lamp load to be flashed, which may comprise two signal lamps 46 and a pilot lamp 48 all in parallel, is connected between terminal 42 and ground. When switch "S" is closed current flow from the battery through the snap plate, normally closed contact 10, coil 34 and the lamp load to ground. This current will be sufficient to light the lamps and to energize the reed relay. Upon energization of the reed relay, contacts 36 and 38 thereof close, thus closing a circuit from the battery through the heater 20 and the reed contacts to terminal 28 and ground. The heat generated in the heater will cause expansion of the pull wire 14 which, after a predetermined time, will expand to a point where the snap plate moves out of engagement with contact 10, thus opening the circuit of the relay coil and of the lamps. The lamps thus become extinguished and the reed contacts thus open, opening the circuit of the heater. When the pull wire cools sufficiently, the snap plate moves back into position to close the circuit of the relay coil and the cycle repeats. With the foregoing circuit, because the lamp load is not in series with the heater at any time, variation in current through the lamps will not change the rate of flashing, that is the rate of expansion and contraction of the pull wire. Any number of lamps may be flashed in the lamp load provided the reed relay is initially adjusted for the expected load. Such adjustment may be affected by change in position of the relay coil on the tube 32 or by change in the number of turns in the relay coil. Once the reed relay is adjusted for the desired lamp current, if one lamp burns out the current through the reed relay will be insufficient to cause the relay contacts to close. Accordingly, the pull wire will remain cold and the remaining lamps and the pilot lamp will burn steady giving a positive pilot indication.

Figure 3:
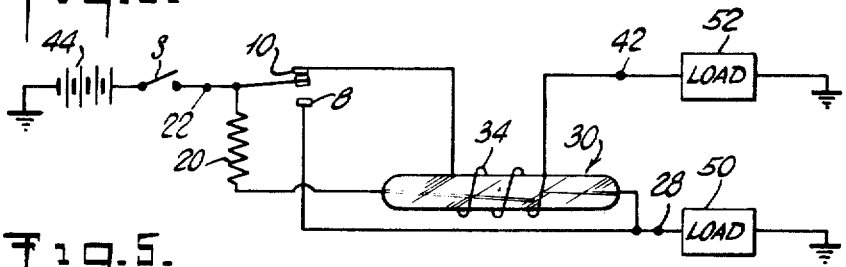
FIG. 3 is a diagram representing an alternative circuit arrangement for the device of FIG. 1.

In the circuit of FIG. 2 only the normally closed contact of the snap plate are employed and pilot and signal lamps are connected in parallel between the terminal 42 and ground. If it is desired to employ the structure of FIG. 1 in a device that alternately energizes two loads the circuit of FIG. 3 may be employed without change in structure of the device. In this circuit terminal 22 is connected through switch "S" to battery 44 as in FIG. 2. Terminal 22 is also connected to the snap plate and to one end of the heater 20. The other end of the heater is connected through the relay contacts to terminal 28. The relay coil is connected between the normally closed contact 10 of the snap plate and terminal 42. The normally open contact 8 of the snap plate is connected to terminal 28. Terminals 28 and 42 are respectively connected through lamp loads 50 and 52 to ground for alternate energization of the two lamp loads with expansion and contraction of the pull wire. When the switch is closed current flows through the normally closed contact 10 and relay coil to energize the lamp load 52 connected to terminal 42. Energization of the relay coil closes the circuit for the heater and for the load 50 connected to terminal 28. As the heater is in series with the load 50 the current will be insufficient to cause the lamps of that load to light. When however, the pull wire is expanded sufficiently to cause the snap plate to move out of engagement with contact 10 and engage the contact 8 the heater is shunted and the lamps of load 50 receive full voltage from the battery. At the same time the circuit for load 52 is opened at contact 10. The reed contacts then open, opening the circuit of the heater and permitting the pull wire to cool. Thus, with this circuit arrangement, the lamp loads are alternately flashed. Load 52 being connected with the normally closed contact 10 will not effect the rate of flashing. The lamp load 50 which is energized through the normally open contact 8 also will not effect the flashing rate. Thus, the circuit of FIG. 3 is that of an alternate flasher independent of load. So far as pilot action is concerned, if a lamp of load 52 burns out the remaining lamps of load 52 will remain steady on, and the lamps of load 50 will remain steady off as the relay contacts will not close.

Figure 4:
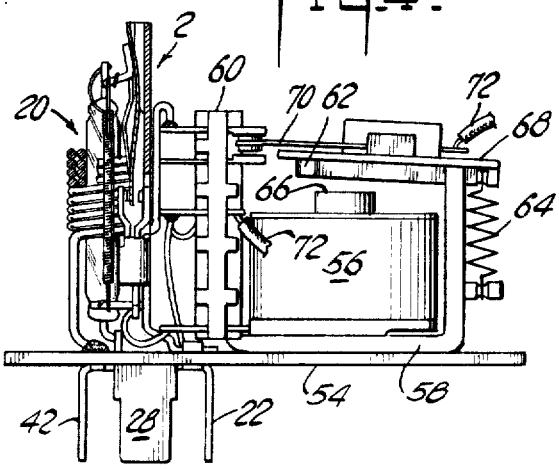
FIG. 4 is a side view of a heavy duty alternate load flasher embodying the invention.
Figure 5:
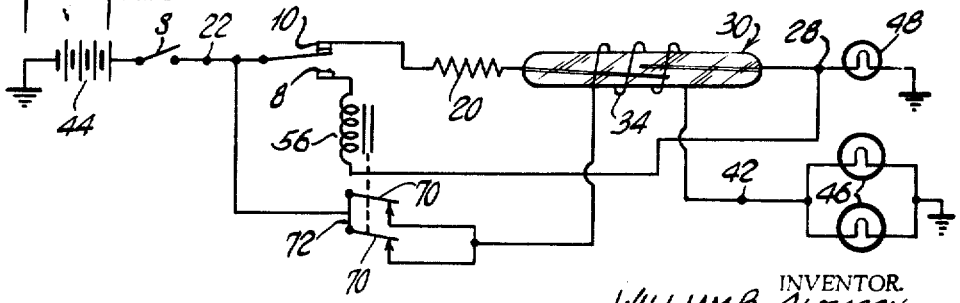
FIG. 5 is a diagram showing a circuit arrangement for the device of FIG. 4.

In FIG. 4 there is shown a heavy duty flasher of the general type of that of FIG. 1 but incorporating an additional relay. The flasher of FIG. 4 includes a relatively extended base member 54 of insulating material provided with prong terminals 22, 42 and 28 as in the embodiment of the invention illustrated in FIG. 1. Fingers of the prong terminals support the snap switch 2 and reed relay 30. On the remaining portion of the base 54 is mounted a relay coil 56 which is supported on a horizontal leg of a right angle bracket 58. Between the relay winding and the snap switch 2 is an insulating wall 60 through which conductors extend for connections to the relay winding and to the movable contacts of the relay. Hingedly mounted on the upper end of the vertical leg of bracket 58 is an armature 62 which is spring biased by a relatively heavy spring 64 away from the core 66 of the relay 56. A thin plate 68 of insulating material is mounted on the armature 62 and supports a pair of leaf springs 70 (only one being visible in the view of FIG. 4). These leaf springs are connected through leads 72 to connecting pins extending through the wall 60. The spring 64 biases contacts carried by the leaf springs 70 into engagement with fixed contacts mounted on connectors extending through the wall 60. No attempt has been made in the drawing of FIG. 4 to show the various electrical connections of the structure as these will be apparent from the diagram of FIG. 5 to which reference may now be had.

Terminal 22 as in the structure previously described, is connectable through the switch "S" to the positive terminal of battery 44. The terminal is also connected to the snap plate and through the normally closed contact 10 to the heater 20 for the pull wire and to one contact of the reed relay, the other contact of the reed relay, being connected to terminal 28. The normally open contact 8 of the snap plate is connected to one end of the relay winding 56, the other end of the winding 56 being connected to terminal 28. Terminal 22 is also connected to the leads 72 leading to the contact carrying leaf springs 70. The normally closed contacts associated with the leaf springs are connected to one end of the reed relay coil 34, the other end of which is connected to terminal 42. A pilot lamp 48 may be connected between terminal 28 and ground, and a lamp load, shown as lamps 46, may be connected between terminal 42 and ground. With the described circuit when the switch is closed current flows through the normally closed contacts of the relay 56 and through the coil 34 of the reed relay to light the lamps 46. This current energizes the reed relay to close its contacts whereupon current flows through the heater 20 and the pilot light 48. The pilot light will not light because of the resistance of the heater 20 in series therewith. However, the heater will cause expansion of the pull wire and consequent snapping of the snap plate from engagement with contact 10 into engagement with contact 8. This energizes the relay 56 to open the normally closed contacts thereof. The current through the relay 56 will be sufficient to light the pilot lamp. The movement of the snap plate opens the circuit of the heater 20 which thereupon cools to contract the pull wire. The opening of the contacts of relay 56 cuts off the current to the reed coil to open the reed contacts. Thus, when the pull wire has cooled sufficiently to cause the snap plate to move back into engagement with contact 10 the circuit through the heater is open at the reed contacts and remains open until relay 56 releases to permit the contacts carried by leaf springs 70 to close the circuit through the coil of the reed relay. Lamps 46 are extinguished when relay 56 is energized because the circuit thereof is open at the relay contacts. Pilot lamp 48 is dimmed when the relay 56 is deenergized because the resistance of heater 20 is then in series with the pilot lamp. Thus the device operates to alternately flash the lamp loads connected to terminals 28 and 42. If one of the lamps connected to terminal 42 burns out the current through the reed coil will be insufficient to cause closure of the reed contacts and hence heater 20 and relay 56 cannot be energized and the lamp 48 will be steady off. The remaining lamp of the load connected to terminal 42 will be steady on.

With the powerful relay of the structure of FIG. 4 any number of lamps may be connected in the circuit connected to terminal 42 and hence this flasher has a wide utility for use on trailer trucks or the like where many signal lamps or warning lamps are to be flashed.

The invention has now been described in connection with two specific constructions. Although in each of the illustrated embodiments of the invention the pull means of the snap switch have been shown as comprising a tensioned wire having a heater wound about it for controlling contraction and expansion of the pull wire, obviously the pull means could comprise the wire itself in series with a ballast resistor as in the flasher of the above mentioned Schmidinger patent. Thus in the circuits of FIGS. 2, 3 and 5 the heater 20 can be considered as a pull wire and ballast resistor. Although the particular snap plate shown in the said Schmidinger patent and diagrammatically illustrated herein is preferred in the structure of the device of the invention, obviously other snap acting hot wire controlled flashers could be employed in the structure of the invention. For example, the hot wire controlled snap plate of Siiberg Patent 3,052,780 could be substituted for the illustrated snap plate.

Various other changes may be made in the described constructions and various alternative circuit arrangements can be employed without departing from the spirit of the invention or the scope of the accompanying claims.

I claim:

1. A three-terminal independent load flasher comprising a snap switch having a fixed and a movable contact normally biased out of engagement, said movable contact being connected to a first one of the terminals, a heat expandable pull means which when cold operates to maintain the contacts closed against the bias thereof and a heater for the pull means, one end of the heater being connected to said first terminal, a reed relay having a coil and normally open contacts which close when the current through the coil exceeds a predetermined value, one of said reed relay contacts being connected to the other end of said heater and the other of said reed relay contacts being connected to a second one of the terminals, said relay coil being connected between said fixed contact and the third one of said terminals, whereby when a source of potential and a lamp load to be flashed is connected across the first and third terminals and the source of energy is connected across said first and second terminals the lamp load will be flashed when the current therethrough exceeds said predetermined value and will remain steady-on when the current through the load falls below said predetermined value.

*2. A flasher comprising a snap switch having a fixed contact and a movable contact; a heat expansible pull means which when cold and contracted maintains said fixed and movable contacts engaged and which when heated and expanded causes said fixed and movable contacts to disengage; heating means in proximity to said pull means for heating said pull means; a reed relay having a relay coil and two relay contacts, said relay coil being rendered operative upon flow of current therethrough above a predetermined value to close said relay contacts and being disabled upon flow of less current therethrough to maintain said relay contacts open; said snap switch being in series with said relay coil; first and second terminal means for connecting a voltage source to one side and a lamp load to the other side of said series-arranged snap switch and relay coil, said heating means being in series with said relay contacts so that said heating means may be energized to heat and expand said pull means only when said relay contacts are closed; means for passing current through said heating means and said relay contacts in a path which is in parallel to the current path through said fixed and movable contacts, relay coil and lamp load terminal; whereby a lamp load connected to the terminal therefor will be flashed by repetitive engagement and disengagement of said fixed and movable contacts as long as the flow of current through said relay coil is at a value above said predetermined value.*

*3. A flasher as in claim 2 in which said voltage source terminal is connected to said movable contact and which includes a second fixed contact which is engaged by said movable contact when said pull means is heated and expanded; a third terminal for connection to a second lamp load; said second fixed contact being in series with said third terminal and said series-arranged second fixed contact and third terminal being in parallel with said heating means and relay contacts; whereby first and second lamp loads connected to the respective terminals therefor will be alternately flashed by repetitive engagement of said movable contact with said first and second fixed contacts.*

*4. A flasher comprising a snap switch having first and second fixed contacts and a movable contact normally engaged with said first fixed contact; a heat expansible pull means which when cold and contracted maintains said first fixed and movable contacts engaged and which when heated and expanded causes said movable contact to disengage from said first fixed contact and engage with said second fixed contact; heating means in series with said first fixed contact and in proximity to said pull means for heating said pull means; a reed relay having a coil and two normally open reed relay contacts, said reed relay contacts being in series which said heating means, said reed relay coil being rendered operative upon flow of current therethrough above a predetermined value to close said reed relay contacts and being disabled upon flow of less current therethrough to maintain said reed relay contacts open; a second relay having a coil and at least one pair of normally closed contacts, said normally closed contacts being in series with said reed relay coil; first and second terminal means for connecting a voltage source to one side and a first lamp load to the other side of said series-arranged normally closed contacts and reed relay coil; a third terminal in series with said reed relay contacts for connection to a second lamp load; said second relay coil being in series between said second fixed contact and said third terminal and being rendered operative by flow of current therethrough upon engagement of said movable contact with said second fixed contact to open said normally closed contacts; whereby first and second lamp loads connected to the respective terminals therefor will be alternately flashed by repetitive engagement of said movable contact with said first and second fixed contacts as long as the flow of current through said reed relay coil is at a value above said predetermined value.*

References Cited

The following references, cited by the Examiner, are of record in the patented file of this patent or the original patent.

UNITED STATES PATENTS 3,196,311 7/1965 Bleiweiss et al. ------- 315—77

FOREIGN PATENTS 1,155,115 4/1958 France.

JOHN W. HUCKERT, Primary Examiner

R. F. POLISSACK, Assistant Examiner

U.S. Cl. X.R.

315—71, 72, 73, 74, 76, 209, 225, 226; 340—81, 84, 331